UNITED STATES PATENT OFFICE.

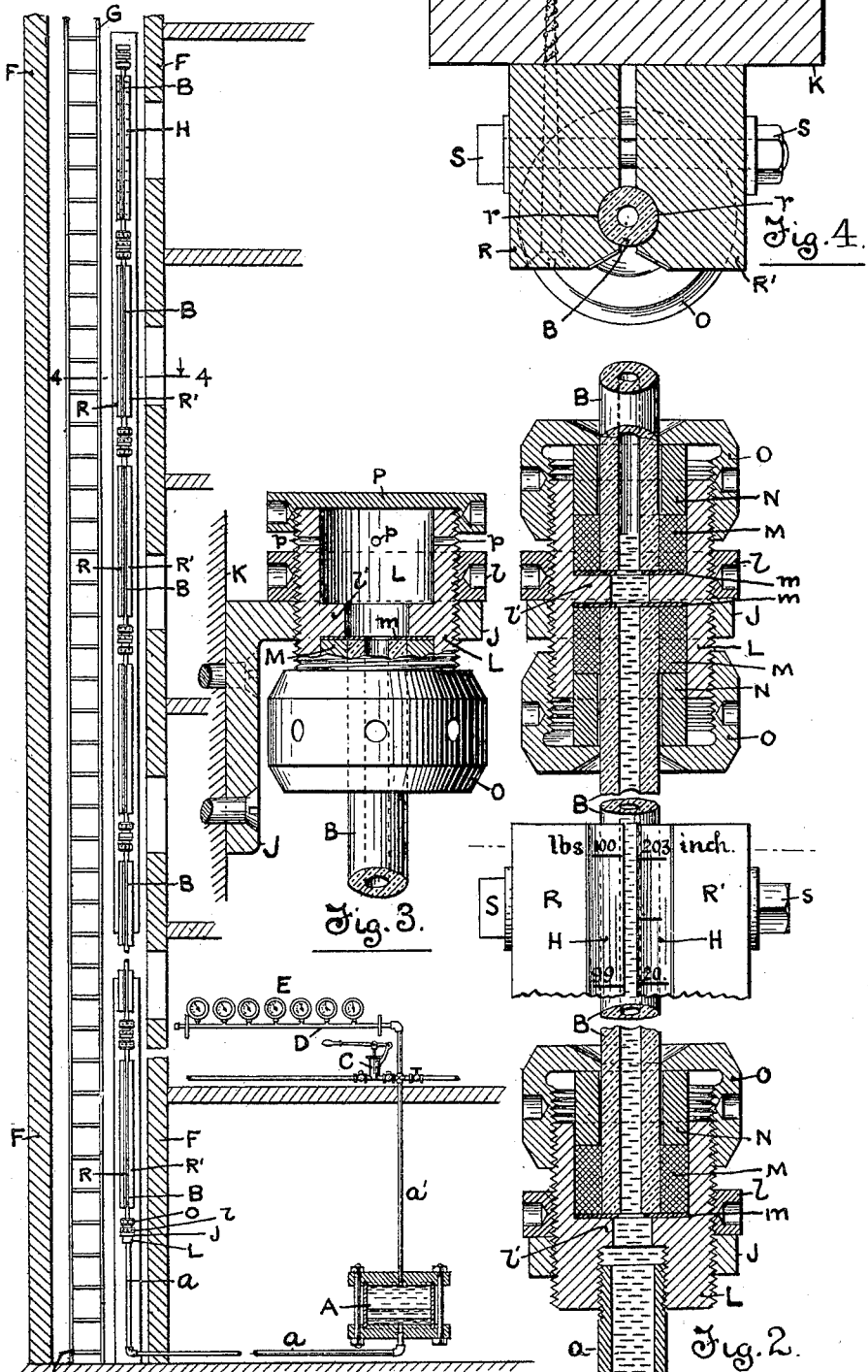

JARVIS B. EDSON, OF SHELTER ISLAND, NEW YORK, ASSIGNOR TO THE ASHCROFT MANUFACTURING COMPANY, OF BRIDGEPORT, CONNECTICUT.

GAGE-TESTING APPARATUS.

SPECIFICATION forming part of Letters Patent No. 581,675, dated April 27, 1897.

Application filed July 29, 1896. Serial No. 600,994. (No model.)

*To all whom it may concern:*

Be it known that I, JARVIS B. EDSON, a citizen of the United States, residing in Shelter Island, in the county of Suffolk and State of New York, have invented certain new and useful Improvements in Gage-Testing Apparatus, of which the following is a specification.

This invention relates to an apparatus for testing pressure-gages and similar instruments, in which apparatus are combined a mercury pot or receptacle, a pump or means for forcing oil or other proper fluid into such pot to displace the mercury therein, a vertical column or tube connected with such pot to receive the mercury and indicate the pressure attained, and means for connecting with the pot the gages or instruments to be tested. In an apparatus of this character the vertical mercury-column is made up of a succession of glass tubes placed end to end and connected together in order that a sufficient length may be obtained for registering high pressures. The difficulties heretofore experienced with such columns have been leakages at the joints of connection and a bowing or bending of the tubes under high pressures.

The object of my invention is to overcome these difficulties, which is accomplished as hereinafter described and claimed.

In the accompanying drawings, Figure 1 represents a testing apparatus in elevation, with portions of the walls and floors of a building in which it is located shown in section. Fig. 2 shows, in vertical section and on a much larger scale, portions of the mercury-column as constructed in accordance with my invention. Fig. 3 represents, on the same scale, the head of the column, partially in elevation and partially in section. Fig. 4 shows, on the same scale, a transverse section of the column and the improved supports for the glass tubes on line 4 4 of Fig. 1.

Briefly described, the apparatus in general consists of a mercury-pot A; a metallic pipe $a$, leading from such pot to the column composed of the glass tubes B and their connections, a pipe $a'$, leading from the pot to the pump or pressure-producing device C, and a suitable connection or device D, to which the instruments E to be tested can be attached.

The column is shown within the walls F of a building, which is supplied with a ladder G, contiguous to the column, so that the whole length of the latter may be traversed, and a scale H of the desired length is placed in such relation to the column that the height of the mercury therein and the pressure attained can be observed.

My improved column is held in position by angular metal brackets J, Figs. 2 and 3, which are attached to a plank or other proper support K, where the connections between the tubes of the column are made. These connections consist of metallic sleeves L, which are threaded upon their exterior surface and are screwed into the brackets, being held in their adjusted positions by jam-nuts $l$, screwed down upon the sleeves into engagement with the brackets. In building up the column the lowest sleeve L is screwed down into its bracket and upon the end of the pipe $a$, Fig. 2. A rubber or other suitable elastic washer $m$ is then placed in the sleeve to rest upon the annular shoulder $l'$. A packing-ring M, of rubber or other proper elastic material, is placed upon the lower end of the first glass tube B, and the tube and ring are inserted into the bore of the sleeve until the end of the tube rests upon the washer. A metallic ring N and a clamp-nut O are then slid down over the tube and the nut is screwed down upon the sleeve until the ring H has sufficiently compressed the elastic ring M to produce a leak-tight joint between the tube and sleeve. A second nut O, ring N, and packing-ring M are slid over the top of the tube. A second sleeve L, having washers $m$ $m$ therein, is screwed into a second bracket J until the upper end of the tube comes in contact with the lower washer $m$, when a jam-nut $l$ is screwed down over the sleeve and into engagement with the bracket to lock the sleeve in place. The nut O is now screwed up to compress and thereby radially expand the packing-ring M and form a leak-tight joint around the tube. Another tube is inserted into the upper end of this same sleeve, and the lower end of the tube is secured and packed therein in the manner already described. These operations are repeated in building up the column until it is of the desired height, when a cap P, Fig. 3, is screwed upon the uppermost sleeve to keep out the dust, the said sleeve having perforations $p$ to allow the escape of air as the mercury rises in the column. This construction enables a column of any height to be made up of comparatively short and inexpensive glass tubes, and all leakage at the connections between the tubes is prevented.

Although the rings N are shown as independent of the nuts O, the rings may be integral with the nuts, if desired, as will be readily understood.

To prevent the glass tubes composing the columns from bowing or springing under heavy pressures, means are provided to keep them in exact vertical position at all times. These means consist of blocks R R' on each side of the tubes. These blocks are furnished with grooves $r$, Fig. 4, each of which fits nearly one-half of the circumference of the tubes, and the blocks R are screwed or otherwise securely attached to the plank or backing K. Bolts S pass through the blocks, and nuts $s$, threaded upon the bolts, clamp the blocks tightly upon the tubes.

The constructions described insure practically a perfect column, so that the pressure-tests will be accurate.

What I claim as my invention, and desire to secure by Letters Patent, is—

1. The improved mercury-column consisting of a succession of tubes one above another; coupling-sleeves between the tubes; stationary brackets in which said sleeves are secured; elastic packings surrounding the tubes within the sleeves; and means on the sleeves for compressing the packings, substantially as and for the purposes specified.

2. In a mercury-column, the combination of a succession of tubes one above another; coupling-sleeves having interior annular shoulders between the tubes; stationary brackets in which said sleeves are secured; elastic washers between said annular shoulders and the tube ends; elastic packings surrounding the tubes within the sleeves; and means on the sleeves for compressing said packings, substantially as set forth.

3. In a mercury-column, the combination of a succession of tubes one above another; exteriorly-threaded coupling-sleeves between the tubes; stationary brackets into which the sleeves are screwed; jam-nuts on the sleeves for engaging the brackets and locking the sleeves in position thereon; elastic packings surrounding the tubes within the sleeves; and means on the sleeves for compressing said packings, substantially as set forth.

4. In a mercury-column, the combination of a succession of tubes one above another; coupling-sleeves between the tubes; stationary brackets into which said sleeves are screwed; jam-nuts on the sleeves for locking them in place on the brackets; elastic packings surrounding the tubes within the sleeves; rings around the tubes and engaging the packings; and clamp-nuts on the sleeves engaging said rings, substantially as and for the purposes specified.

5. In a mercury-column, the combination of a succession of glass tubes one above another; couplings connecting the ends of the tubes; stationary brackets in which said couplings are secured; and grooved blocks flanking the tubes and clamped thereon, substantially as set forth.

JARVIS B. EDSON.

Witnesses:
F. GARRETT,
CHAS. W. FORBES.